United States Patent [19]

Wilhelmsson

[11] 4,198,216
[45] Apr. 15, 1980

[54] ARRANGEMENT FOR THE EXCHANGE OF FILTER ELEMENTS

[75] Inventor: Gunnar R. Wilhelmsson, Växjö, Sweden

[73] Assignee: AB Svenska Fläktfabriken, Nacka, Sweden

[21] Appl. No.: 915,992

[22] Filed: Jun. 15, 1978

[30] Foreign Application Priority Data

Jun. 29, 1977 [SE] Sweden .............................. 7707542

[51] Int. Cl.² ............................................. B01D 41/00
[52] U.S. Cl. .................................... 55/341 R; 55/288; 55/301; 55/350; 55/356; 55/359; 55/422; 55/481
[58] Field of Search ............... 55/96, 341 R, 341 MC, 55/341 NT, 356, 359, 362, 422, 478, 481, 350, 484, 288, 301; 210/234, 237

[56] References Cited

U.S. PATENT DOCUMENTS

| 748,088 | 12/1903 | Moore | 210/237 |
|---|---|---|---|
| 3,341,023 | 9/1967 | Seter | 210/237 |
| 3,422,601 | 1/1969 | Kolb | 55/481 X |
| 3,788,046 | 1/1974 | Kaeppler et al. | 55/341 R |
| 3,823,532 | 7/1974 | Cooper et al. | 55/422 X |
| 3,922,974 | 12/1975 | Hempelmann | 55/341 R X |

FOREIGN PATENT DOCUMENTS

2406471  8/1974  Fed. Rep. of Germany ..... 55/341 NT

*Primary Examiner*—Kathleen J. Prunner
*Attorney, Agent, or Firm*—Frishauf, Holtz, Goodman & Woodward

[57] ABSTRACT

An arrangement for the exchange of filter hoses which are arranged in parallel in a filter box which is introduced into a filter chamber where contaminated gas enters through the sides of the filter hoses and purified gas leaves through their open ends. The filter box comprises a frame in which the open ends of the filter hoses are detachably fixed. The filter box is introduceable into a special chamber for the exchange of dirty filter hoses for clean ones by lowering the filter box through an opening in the chamber until the frame rests on supporting elements arranged in the opening. The detachable ends of the filter hoses are accessible from the "pure gas side," and the filter hoses, after being detached from the frame, drop down into the bottom of the exchange chamber for collection of the dirty filter hoses.

5 Claims, 9 Drawing Figures

To source of underpressure

ARRANGEMENT FOR THE EXCHANGE OF FILTER ELEMENTS

BACKGROUND OF THE INVENTION

The present invention relates to an arrangement for the exchange of filter elements, for instance in the form of hoses which are open at one end and closed on the other. These filter elements are arranged in parallel in a filter box which can be introduced into a filter chamber where contaminated gas is made to enter through the sides of the filter elements and leave through their open ends, while impurities are separated on their outsides. The box comprises a frame in which the open ends of the filter elements are detachably fixed.

The exchange of filter elements in such filter installations is currently effected by lifting the filter box by means of a crane or trolley hoist, and possibly placing it on a carriage or truck for further transport to a special building, where the filter box is unloaded and the filter elements are exchanged, whereafter the box is transported back to the filter chamber. This conventional method of handling filter boxes has many disadvantages. It is time consuming and requires transport; moreover, the boxes must be so constructed that they withstand the stresses both during transport and also when they are placed on a support for the exchange of the filter elements. The most serious disadvantage is, of course, the fact that during the exchange of filter elements, the service personnel comes in direct contact with the contaminated outside of the filter elements. In filters of the above mentioned type, the filter elements are often fixed to a frame portion of the box by means of hose clamps or the like and taking off the individual elements also involves time-consuming and tiresome work.

SUMMARY OF THE INVENTION

These disadvantages are eliminated by an arrangement according to the present invention which is mainly characterized by the feature that the filter box can be introduced into a special chamber for the exchange of the filter elements having at least one opening into which the filter box can be lowered until the frame rests on supporting elements arranged in the opening, whereby the detachable ends of the filter elements are accessible from the "pure gas side." The bottom of the exchange chamber is intended for the collection of the filter elements which, after having been detached from the frame, drop down in said exchange chamber.

In a suitable embodiment, the filter exchange chamber is provided with two closely spaced openings of which one receives the box of which the filters have to be changed while the other holds a box in which the exchange of the filters has already been effected and which can therefore replace the before mentioned box. A filter exchange chamber according to the invention can be constructed advantageously in such a manner that it forms an integrated part of a filter plant.

In order to avoid dust nuisance in the room where the exchange of filters takes place and substantially improve the working conditions for the personnel, the interior of the filter exchange chamber is connected to a source of underpressure. In the case where the filter exchange chamber forms part of a filter plant, it is suitable to connect the chamber to a part of the filter plant where a sufficient underpressure is encountered, for instance the crude gas duct.

In an arrangement according to the invention, hoses are introduced from above into the openings in a frame and the open end of each of the filter hoses is provided with a resilient collar which can be clamped with a certain force in the opening provided for fastening. The walls of the filter hoses are kept expanded by means of a basket introduced into the opening. Detaching of the hoses takes place in the same simple way, by pulling-out the baskets, whereafter the resilient collars of the filter hoses are bent in, so that the hose can be moved from the opening either downwards or upwards. In the arrangement according to the invention, one simply lets the filter elements drop onto the bottom of the filter exchange chamber, from where they can later be removed, if desired in a container.

BRIEF DESCRIPTION OF THE DRAWINGS

An embodiment of the invention chosen as an example will be described more in detail in the following with reference to the attached drawings, in which.

DETAILED DESCRIPTION

Figure 1:
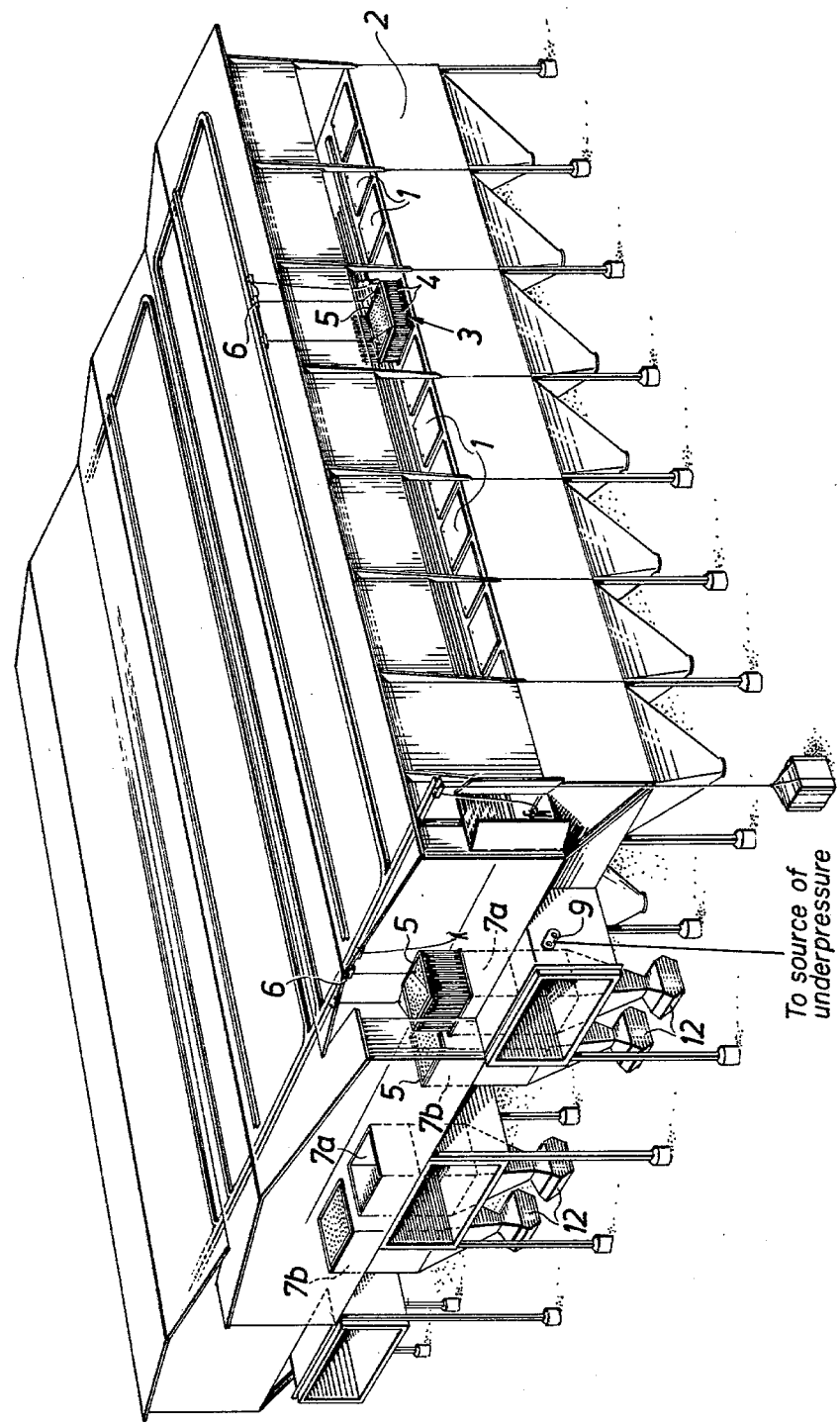
FIG. 1 shows a perspective view of a filter plant with filter exchange arrangements according to the invention.
Figure 2:
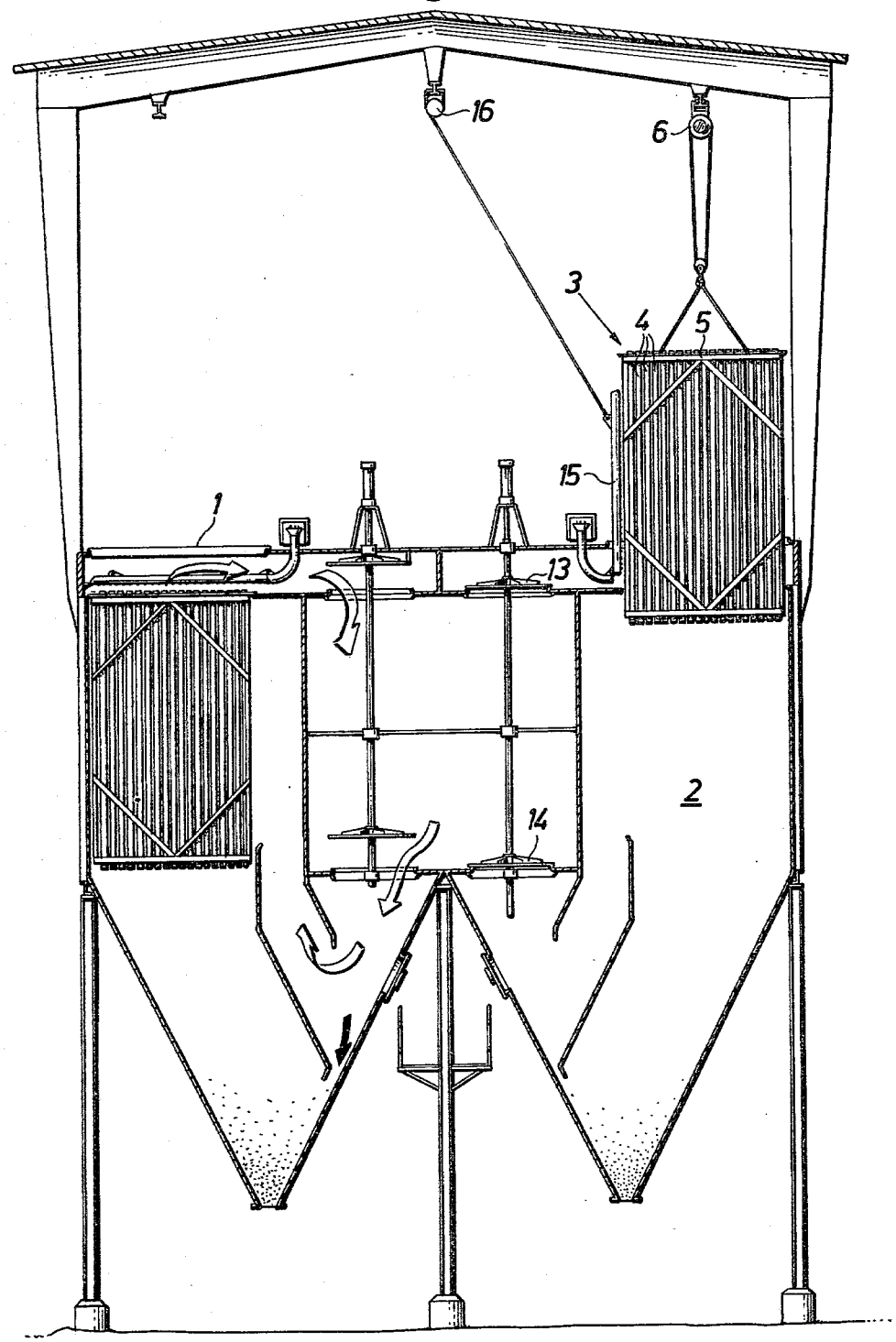
FIG. 2 shows a section through two filter chambers arranged as a pair, with the filter hoses therein.

The filter plant shown in FIG. 1 comprises a plurality of units, each comprising a filter chamber 2 which can be closed by a cover 1 (see FIG. 2). Into this filter chamber is introduced a filter box 3 containing a plurality of filter hoses 4 which are held in an upper frame 5 on the filter box. FIG. 1 shows how one of the filter boxes 3 is lifted out of its filter chamber 2 with the aid of a travelling hoist arrangement 6 for being transported to a filter exchange chamber 7. The filter exchange chamber is an integrated part of the filter plant, which makes it possible to carry out the transport within the plant itself and the distance is therefore comparatively short. The filter exchange chamber can be connected by a throttle valve arrangement 9 to a source of underpressure or vacuum, for instance to the crude gas duct of the filter plant. This prevents the spreading of dust in the room during the exchange of the filter hoses. The filter exchange chamber is provided with containers 12 (FIG. 1) at its lower portion in which the filter hoses are collected after they have been detached from the frame 5 and allowed to drop to the bottom of the filter exchange chamber. The filter exchange chamber 7 is provided with two closely spaced openings 7a and 7b. A container 12 is disposed below each opening. Each opening has support elements arranged therein upon which the frame of a filter box rests when a box is received in the opening. One opening, for example opening 7a, receives a used box in which the filters have to be changed while the other opening 7b holds a box provided with clean filters ready to replace the used box. It is thereby possible to reduce to a minimum the time during which the filter chamber must be shut off on account of the filter exchange, which in turn has a favorable effect on the efficiency of the whole plant. FIG. 2 shows a section through a filter chamber 2 with the filter box 3 either being lifted or lowered with the aid of the travelling hoist 6. The measures which have to precede such an exchange consist of: the inlet and outlet valves 14 and 13, respectively, of the filter chamber 2 are closed; the cover 1 is then taken off, and a nozzle tube 15, intended for the cleaning of the filter, is lowered by hand or with the aid of a telpher 16. The box is then ready for being lifted and transported to the filter exchange chamber as has been described above with reference to FIG. 1.

When placing the boxes provided with new hoses in the filter chamber, the above described steps are carried out in reverse order.

An alternative arrangement can be used in which a pair of filter exchange chambers are provided with each chamber having a single opening for supporting a filter box. In an arrangement of this type the chambers should be arranged close to one another so that it is possible in a simple manner to effect exchange of a filter box with dirty filters for a box with clean filters.

Figure 3A:
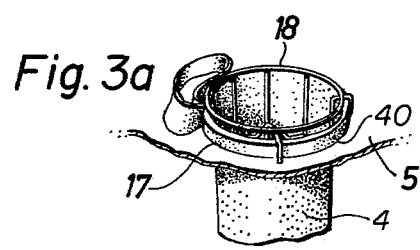
FIGS. 3a–3g show different operational moments during the exchange of a filter hose from the "pure gas side."
Figure 3B:
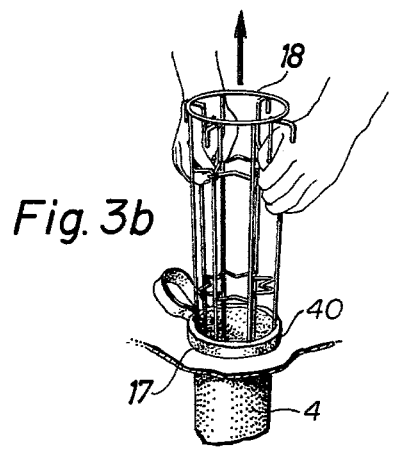
Figure 3C:
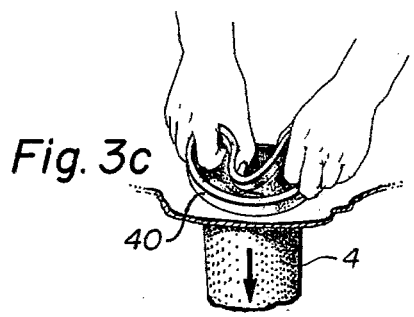
Figure 3D:
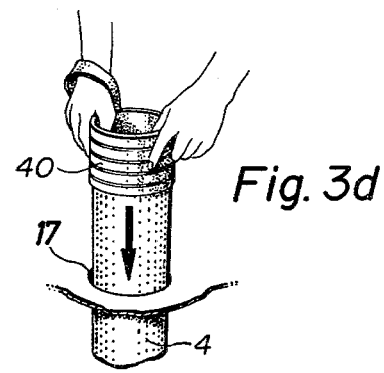
Figure 3E:
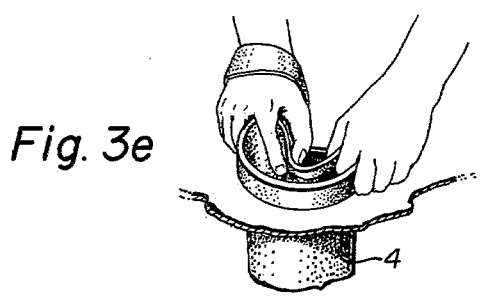
Figure 3F:
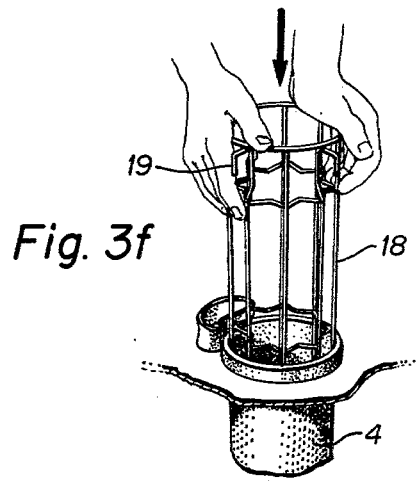
Figure 3G:
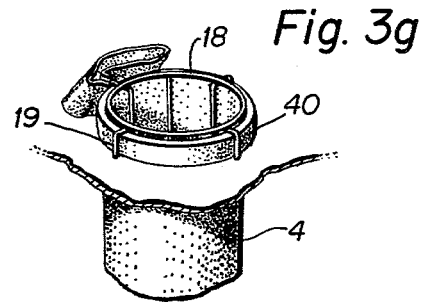

Owing to the filter exchange arrangement according to the invention, the exchange itself of the filters is simplified to a considerable extent because one can advantageously use hose fastening means which are accessible from the "pure gas side" of the box, in the present case the upper side. As seen in FIGS. 3a–3g, the frame 5 is usually formed with openings 17 into which the filter hoses 4 are introduced and the ends of the hoses are held expanded by means of strips of spring steel 40 which are provided on the outside with "filter stuffing" shaped with a rim intended for engagement with the edges of the openings, so that the filter hose ends are held safely fixed in the openings. Such a fixing of the hoses is shown in FIG. 3a. The exchange of a hose is so effected that the basket 18 is pulled out of the hose in the opening 17 as shown in FIG. 3b. The end of the filter hose provided with a spring steel strip 40 is then bent in, as in FIG. 3c, so that its outside which is provided with a rim is disengaged from the edge of the opening 17 and the end of the hose 4 can be lowered in the opening 17, whereafter the hose drops due to its own weight to the bottom of the chamber. A clean hose is then introduced into the opening 17 (FIG. 3d) and the steel strip 40 is bent in as shown in FIG. 3e, whereafter the hose basket 18 is reintroduced into the filter hose as shown in FIG. 3f, said basket being held by supporting legs 19 which rest on points spaced around the opening 17 as shown in FIG. 3g.

I claim:

1. In a filter plant for filtering contaminated gas comprising a plurality of filter units, each filter unit comprising a filter chamber (2) into which at least one filter box (3) is removably insertable, said at least one filter box (3) including an upper frame (5) and a plurality of filter hoses (4) removably mounted in said upper frame (5) and which are open at one end and closed at the other, said filter chamber (2) and filter hoses (4) being arranged such that contaminated gas enters through the outer sides of the hoses and purified gas leaves through their open ends while impurities in said contaminated gas are separated and deposited on the outsides of said filter hoses, said filter hoses being detachably fixed at their open ends to said upper frame (5) and being suspended substantially vertically from said upper frame (5) when said filter box (3) is inserted into a filter chamber (2), the improvement wherein:

said filter plant comprises at least one filter exchange chamber (7) spaced from said filter units and forming an integrated part of the filter plant, said at least one filter exchange chamber having at least two openings (7a, 7b) one of said openings (7a) accommodating a used filter box (3) in which the filter hoses should be exchanged and the other of said openings (7b) accommodating a filter box with clean filter hoses to replace the used filter box in the filter chamber from which the used filter box was removed, said at least one filter exchange chamber at its bottom portion including a collecting means (12) below said one opening (7a) for collecting the filter hoses which are detached from the frame (5) of said used filter box and which drop to the bottom of said at least one filter exchange chamber during detachment of said filter hoses from said upper frame (5) of said used filter box.

2. A filter plant according to claim 1, comprising means (9) for connecting a source of underpressure to said at least one filter exchange chamber.

3. A filter plant according to claim 1 wherein said at least two openings (7a, 7b) of said filter exchange chamber are adjacent each other.

4. A filter plant according to either of claims 1 or 3 comprising a collecting means (12) below each of said openings of said filter exchange chamber.

5. A filter plant according to claim 1 wherein said plurality of filter chambers (2) are adjacent each other, and comprising means for conveying at least one filter box between a respective filter chamber and said at least one filter exchange chamber.

* * * * *